(12) United States Patent
Suzuki et al.

(10) Patent No.: US 9,525,278 B2
(45) Date of Patent: Dec. 20, 2016

(54) ELECTRICAL-WIRE-PROTECTING MEMBER USING TYING MEMBER

(71) Applicant: YAZAKI CORPORATION, Tokyo (JP)

(72) Inventors: Kenji Suzuki, Shizuoka (JP); Megumi Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 51 days.

(21) Appl. No.: 14/400,839

(22) PCT Filed: Jul. 24, 2013

(86) PCT No.: PCT/JP2013/070070
§ 371 (c)(1),
(2) Date: Nov. 13, 2014

(87) PCT Pub. No.: WO2014/017547
PCT Pub. Date: Jan. 30, 2014

(65) Prior Publication Data
US 2015/0136477 A1 May 21, 2015

(30) Foreign Application Priority Data

Jul. 25, 2012 (JP) ................. 2012-165184

(51) Int. Cl.
*H02G 3/04* (2006.01)
*H01R 13/58* (2006.01)
*H01R 13/56* (2006.01)

(52) U.S. Cl.
CPC ............ *H02G 3/0468* (2013.01); *H01R 13/56* (2013.01); *H01R 13/5825* (2013.01); *H02G 3/0418* (2013.01)

(58) Field of Classification Search
USPC ....................................... 174/70 C
See application file for complete search history.

(56) References Cited

U.S. PATENT DOCUMENTS 6,056,587 A 5/2000 Matsuoka et al.
6,162,085 A * 12/2000 Chugh ............... H01R 13/5825
439/275

(Continued)

FOREIGN PATENT DOCUMENTS

CN 1198032 A 11/1998
JP 2002-343497 A 11/2002

(Continued)

OTHER PUBLICATIONS

International Search Report and Written Opinion of the International Search Report for PCT/JP2013/070070 dated Oct. 22, 2013.

(Continued)

*Primary Examiner* — Chau N Nguyen
*Assistant Examiner* — Muhammed Azam
(74) *Attorney, Agent, or Firm* — Kenealy Vaidya LLP

(57) ABSTRACT

An electrical wire cover (11) has a corrugated tube fixing portion (29) and engagement projection strips which are integral parts of a cover body (27) which surrounds electrical wires (19) to be cabled, an electrical wire tie (43) which fixes, that is, tightly fastens, a corrugated tube (31), and tying member restricting portions (49) provided in the corrugated tube fixing portion (29). Each tying member restricting portion (49) has a guide wall portion (55) which guides the tip (53) of the electrical wire tie (43) to a tying member insertion hole (51).

7 Claims, 8 Drawing Sheets

(56) References Cited

U.S. PATENT DOCUMENTS

| | | | | |
|---|---|---|---|---|
| 9,337,633 B2* | 5/2016 | Suzuki | | H02G 3/088 |
| 9,412,494 B2* | 8/2016 | Suzuki | | H01R 13/5825 |
| 2002/0005014 A1* | 1/2002 | Doshita | | B60R 16/027 |
| | | | | 49/360 |
| 2002/0170736 A1 | 11/2002 | Yamashita et al. | | |
| 2002/0179318 A1* | 12/2002 | Seo | | H02G 3/0468 |
| | | | | 174/71 R |
| 2003/0041461 A1* | 3/2003 | Todd | | H02G 3/0468 |
| | | | | 30/210 |
| 2005/0125109 A1* | 6/2005 | Hayashi | | H02G 3/081 |
| | | | | 701/1 |
| 2007/0193002 A1* | 8/2007 | Nitobe | | H01R 13/5812 |
| | | | | 24/16 PB |
| 2008/0119075 A1* | 5/2008 | Suzuki | | H01R 13/506 |
| | | | | 439/153 |
| 2008/0303272 A1 | 12/2008 | Takahashi et al. | | |
| 2009/0050350 A1* | 2/2009 | Katsumata | | H02G 3/0691 |
| | | | | 174/135 |
| 2009/0166480 A1* | 7/2009 | Sakata | | B60R 16/0215 |
| | | | | 248/71 |
| 2009/0301758 A1* | 12/2009 | Suzuki | | B60R 16/0215 |
| | | | | 174/135 |
| 2010/0164226 A1* | 7/2010 | Serizawa | | F16L 3/1091 |
| | | | | 285/149.1 |
| 2010/0229677 A1* | 9/2010 | Murakami | | F16H 61/0006 |
| | | | | 74/606 R |
| 2012/0028486 A1* | 2/2012 | Suemitsu | | H01R 13/56 |
| | | | | 439/157 |
| 2014/0357116 A1* | 12/2014 | Suzuki | | H01R 13/447 |
| | | | | 439/527 |
| 2015/0111441 A1* | 4/2015 | Suzuki | | H01R 13/4223 |
| | | | | 439/871 |
| 2015/0179301 A1* | 6/2015 | Suzuki | | H01R 13/5825 |
| | | | | 174/68.3 |
| 2016/0190782 A1* | 6/2016 | Tsukamoto | | H02G 3/0468 |
| | | | | 174/72 A |

FOREIGN PATENT DOCUMENTS

| | | |
|---|---|---|
| JP | 2005-51003 A | 2/2005 |
| JP | 4089468 B2 | 5/2008 |
| JP | 2008-232222 A | 10/2008 |
| JP | 2008-305612 A | 12/2008 |

OTHER PUBLICATIONS

Japanese Office Action for the related Japanese Patent Application No. 2012-165184 dated Feb. 9, 2016.
Japanese Office Action for the related Japanese Patent Application No. 2012-165184 dated Dec. 1, 2015.
Chinese Office Action for the related Chinese Patent Application No. 201380039124.4 dated Mar. 1, 2016.
Chinese Office Action for the related Chinese Patent Application No. 201380039124.4 dated Aug. 22, 2016.

* cited by examiner

ELECTRICAL-WIRE-PROTECTING MEMBER USING TYING MEMBER

TECHNICAL FIELD

The present invention relates to an electrical wire protecting member.

BACKGROUND ART

Connectors are known that are equipped with a cover for fixing a corrugated tube to a connector housing (refer to Patent document 1, for example).

Connectors of this kind are configured in such a manner that a connector housing and a connector cover (electrical wire protecting member) 501 which are separate members can be detached from each other. As shown in FIGS. 7A and 7B, a connector cover 501 is provided with a fitting part 503 and a tube insertion portion 505. The fitting part 503 is locked on a lock part (not shown) of the connector housing and thereby fitted in or with the connector housing. The tube insertion portion 505 is provided with a cable tie restricting portion 507 which determines a tying position of a cable tie (tying member) 513 by means of a first restriction wall 509 and a second restriction wall 511 (see FIG. 8B).

Two cable tie insertion holes 517 are formed through a cable tie contact portion 515 of the cable tie restricting portion 507 to allow a cable tie 513 to be inserted from the outside to the inside. Made of a synthetic resin, a corrugated tube 523 is formed so as to assume a bellows shape in which its outer circumferential surface is formed with circumferential projection strips 519 and outer circumferential grooves 521 which are arranged alternately, and to be flexible so as to be able to undergo flexural deformation while being curved. The corrugated tube 523 is engaged with both of a first lock projection 525 and a second lock projection 527 because the pitch of the projection strips 519 or the outer circumferential grooves 521 is set equal to the distance between the first lock projection 525 and the second lock projection 527.

When the corrugated tube 523 is to be attached to the connector cover 501, a cable tie 513 is inserted through the cable tie insertion holes 517 at the halfway positions so as to run inside instead of being wound around the entire outer circumference of the tube insertion portion 505. That is, the cable tie 513 is inserted through one cable tie insertion hole 517, then wound around an outer circumferential surface of the corrugated tube 523, inserted through the cable tie insertion hole 517 located on the opposite side, and finally fixed. As a result, the cable tie 513 and the corrugated tube 523 are given a sufficiently long contact portion and the corrugated tube 523 can be fixed to the tube insertion portion 505 properly.

PRIOR ART DOCUMENTS

Patent Documents

Patent document 1: JP-A-2008-305612

SUMMARY OF THE INVENTION

Problems to be Solved by the Invention

However, in work of attaching the corrugated tube 523 to the tube insertion portion 505, it is necessary to insert a cable tie 513 into one cable tie insertion hole 517, wind it around an outer circumferential surface of the corrugated tube 523, and insert it into the cable tie insertion hole 517 located on the opposite side. In this work, to insert the cable tie 513 into the cable tie insertion hole 517 located on the opposite side of the corrugated tube 523, it is necessary to do insertion work while bending the cable tie 513 so as to direct its tip toward the cable tie insertion hole 517 located on the opposite side. Furthermore, in inserting the cable tie 513 into the cable tie insertion hole 517 located on the opposite side, the worker cannot visually recognize the cable tie insertion hole 517 because it is blocked by the corrugated tube 523. This means another problem that it is difficult to insert the cable tie 513 into the cable tie insertion hole 517 and hence the efficiency of the attachment work is low.

The present invention has been made in view of the above circumstances, and an object of the present invention is therefore to provide an electrical wire protecting member which can increase the efficiency of attachment work.

Means for Solving the Problems

The above object of the invention is attained by the following configurations:

(1) An electrical wire protecting member comprising a body which surrounds an electrical wire to be installed; a semicylindrical corrugated tube fixing portion which is an integral part of the body and to which an end portion of a corrugated tube is fixed, wherein the electrical wire is inserted in the corrugated tube; engagement projection strips which project inward from the corrugated tube fixing portion so as to extend in a radial direction of the corrugated tube fixing portion, and which engage with respective outer circumferential grooves of the corrugated tube; a tying member which fixes, by tight fastening, the corrugated tube to an inner peripheral surface of the corrugated tube fixing portion; and tying member restricting portions which are formed in two respective outer circumferential end portions of the corrugated tube fixing portion, and which determine a position of the tying member, wherein each of the tying member restricting portions has a tying member insertion hole through which the tying member can be inserted and a guide wall portion which guides a tip of the tying member to the tying member insertion hole.

In the electrical wire protecting member having the configuration of item (1), to fix, to the corrugated tube fixing portion, the corrugated tube whose end portion is placed in the corrugated tube fixing portion, a tying member is positioned and fixed in such a manner as to be inserted into the tying member insertion holes which are formed in the respective tying member restricting portions. To fix, by winding a tying member around it, the corrugated tube whose outer circumferential grooves are engaged with the respective engagement projection strips which project from the inner peripheral surface of the corrugated tube fixing portion, the tying member is inserted into one tying member insertion hole from the outside of the corrugated tube fixing portion, wound around an outer circumferential surface, exposed on the side of the inner peripheral surface of the corrugated tube fixing portion, of the corrugated tube, and inserted into the tying member insertion hole located on the opposite side. Thus, the corrugated tube is fixed, that is, fastened tightly. For that matter, each guide wall portion for guiding the tip of a tying member to the opening of the corresponding tying member insertion hole which is formed through the corresponding outer circumferential end portions is formed adjacent to the tying member insertion hole. When a tying member that has been inserted through one tying member insertion hole from outside the corrugated tube is inserted into the tying member insertion hole located on the other side, the tying member insertion hole located on the other side is not seen from the side of the inner peripheral surface of the corrugated tube fixing portion because it is blocked by the corrugated tube. However, the worker can easily bring the tip of the tying member to the outside of the corrugated tube fixing portion through the tying member insertion hole located on the other side by causing a tip portion of the tying member to run along the visible guide wall portion.

(2) The electrical wire protecting member according to the configuration of item (1), wherein the guide wall portion has a tapered portion which guides the tip portion of the tying member by bending the tip portion toward a center axis of the corrugated tube fixing portion when the tip of the tying member is inserted from outside the corrugated tube fixing portion to inside the corrugated tube fixing portion.

In the electrical wire protecting member having the configuration of item (2), when inserted into one tying member insertion hole from the outside of the corrugated tube fixing portion (i.e., from the outside of the corrugated tube fixing portion to its inside), the tip of a tying member is inserted to the tapered portion along the guide wall portion. The thus-inserted tip portion of the tying member is pressed against the tapered portion having a prescribed angle θ and thereby bent toward the side of the center axis of the corrugated tube fixing portion (i.e., bent inward) by the prescribed angle θ. When the tying member is pushed in further, it is bent inward by the tapered portion, as a result of which the distance between the tip of the tying member and the tying member insertion hole located on the other side is decreased. This facilitates the insertion work.

The invention has been described above concisely. The details of the invention will become more apparent by reading the following modes for carrying out the invention (referred to below as an embodiment) while referring to the accompanying drawings.

Figure 5:
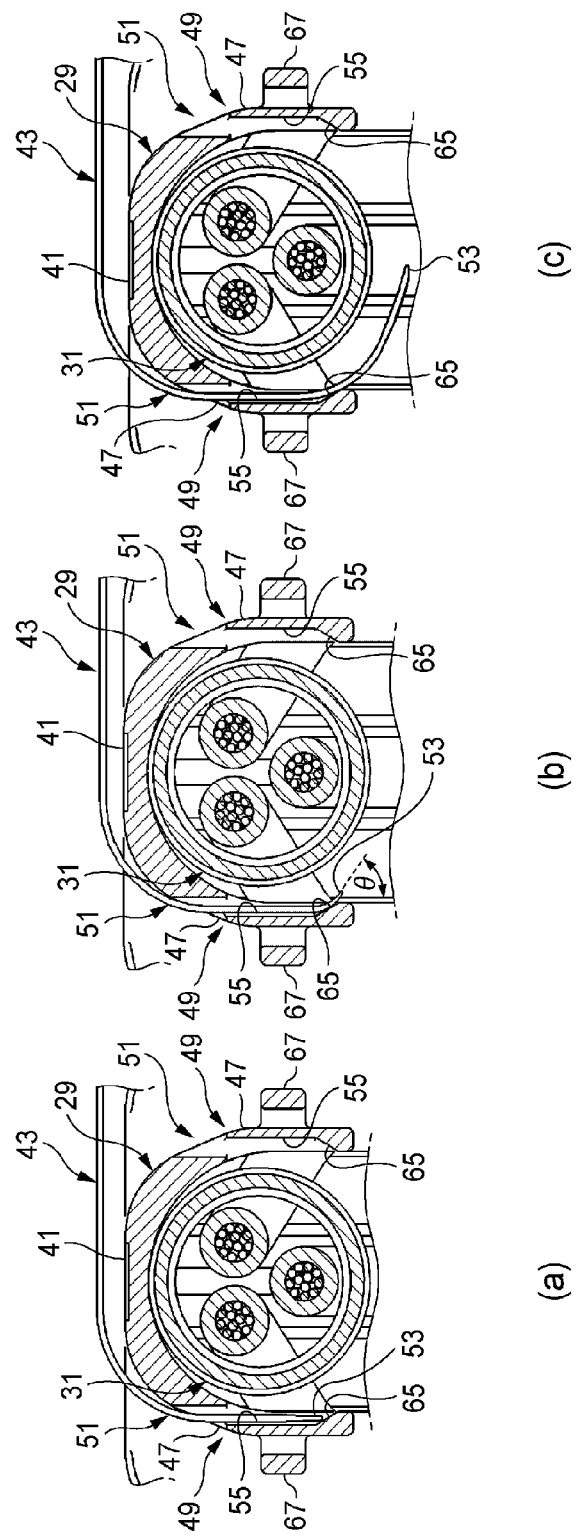

A part (a) of FIG. 5 illustrates an operation that occurs immediately before the tip of a tying member hits a tapered portion of one guide wall portion, a part (b) of FIG. 5 illustrates an operation that a tip portion of the tying member is bent by the tapered portion, and a part (c) of FIG. 5 illustrates an operation that the tip of the tying member is approaching the a tying member insertion hole located on the other side.

Figure 6:
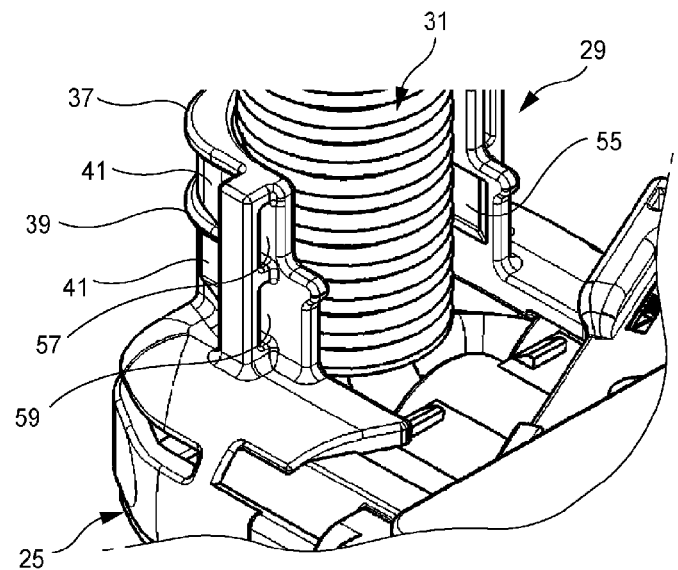

FIG. 6 is an enlarged perspective view of the corrugated tube fixing portion before attachment of an electrical wire tie.

Figure 7A:
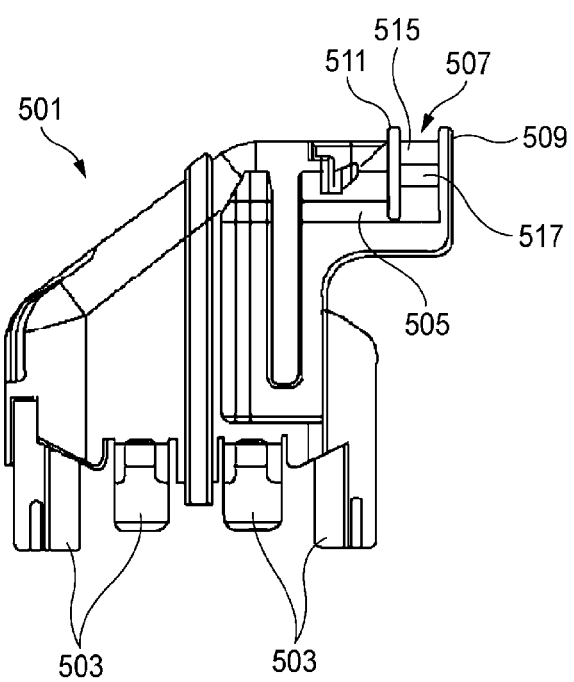

FIG. 7A is a side view of a conventional electrical wire protecting member.

Figure 7B:
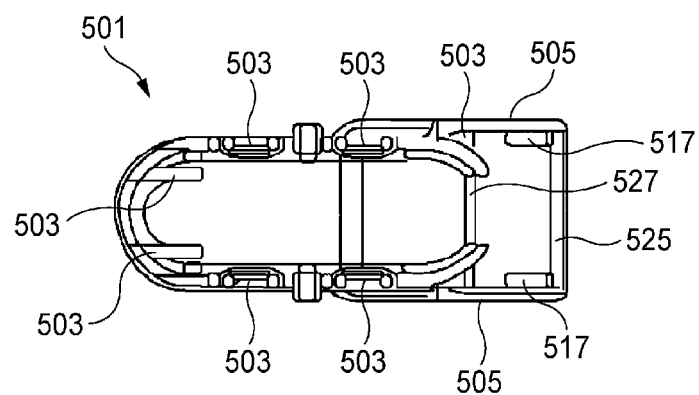

FIG. 7B is a bottom view of the electrical wire protecting member shown in FIG. 7A.

Figure 8A:
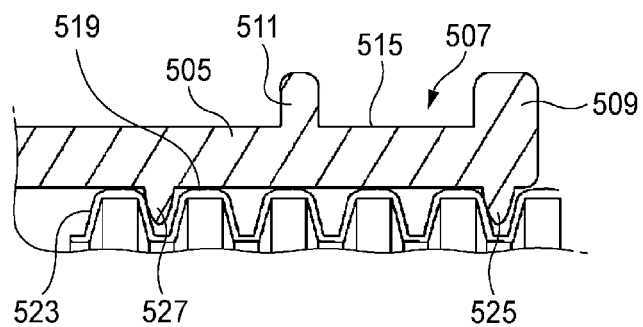

FIG. 8A is an enlarged view of a tube insertion portion in a state that a corrugated tube is fixed to the electrical wire protecting member shown in FIG. 7A.

Figure 8B:
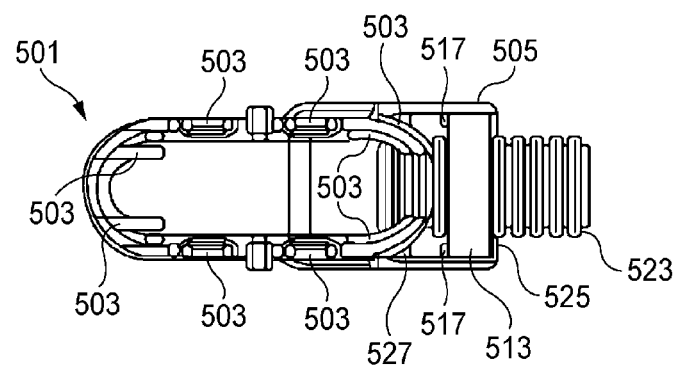

FIG. 8B is a bottom view of the electrical wire protecting member shown in FIG. 7B to which the corrugated tube is fixed.

MODES FOR CARRYING OUT THE INVENTION

An embodiment of the present invention will be hereinafter described with reference to the drawings.

An electrical wire protecting member according to the embodiment of the invention is used as an electrical wire cover, a harness protector, or the like. The embodiment is directed to an example electrical wire protecting member that is an electrical wire cover 11. The electrical wire cover 11 can be applied to, for example, a low insertion force connector 15 (see FIGS. 2A and 2B) which is a connector having a lever 13 for lowering the force that is necessary for insertion into a mating connector (not shown).

Figure 2A:
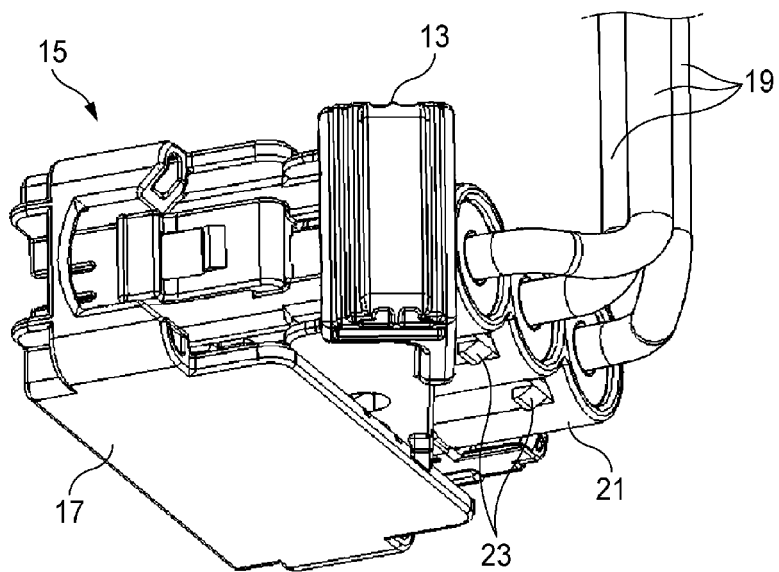
FIG. 2A is a perspective view, as viewed from the electrical wire guide-out side, of a connector to which the electrical wire cover shown in FIG. 1A is to be attached.
Figure 2B:
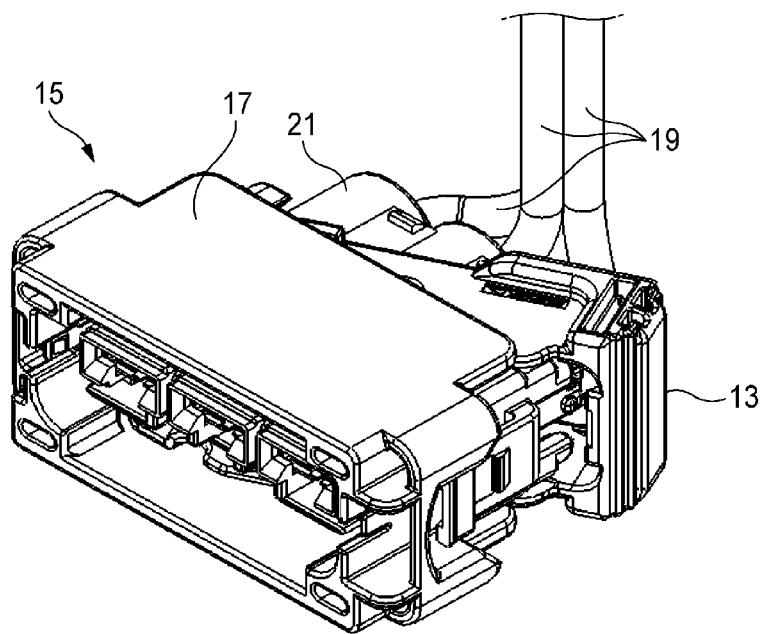
FIG. 2B is a perspective view, as viewed from the side of connection to a mating connector, of the connector shown in FIG. 2A.

As shown in FIGS. 2A and 2B, in the low insertion force connector 15, plural terminals (not shown) are housed in a connector housing 17. An electrical wire 19 is connected to each terminal and guided out from a housing rear portion 21 which is located on the opposite side to the side of fitting into or with the mating connector. The housing rear portion 21 of the connector housing 17 is formed with cover lock projections 23 for locking of the electrical wire cover 11. In the embodiment, the plural electrical wires 19 guided out from the housing rear portion 21 are covered with the electrical wire cover 11 in such a state as to be bent to the direction that is perpendicular to the connector fitting direction (left-right direction in FIG. 2A). That is, the electrical wire cover 11 forms an electrical wire housing path that is bent so as to assume an L shape.

Figure 1A:
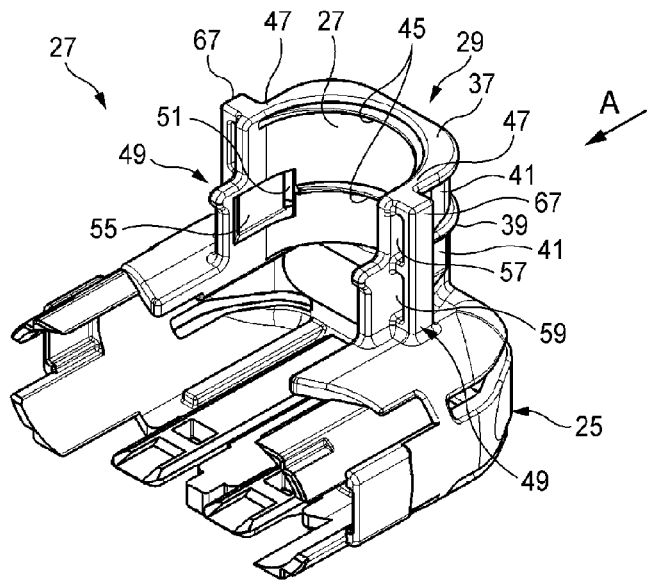
FIG. 1A is a perspective view of an electrical wire cover according to an embodiment of the present invention.
Figure 1B:
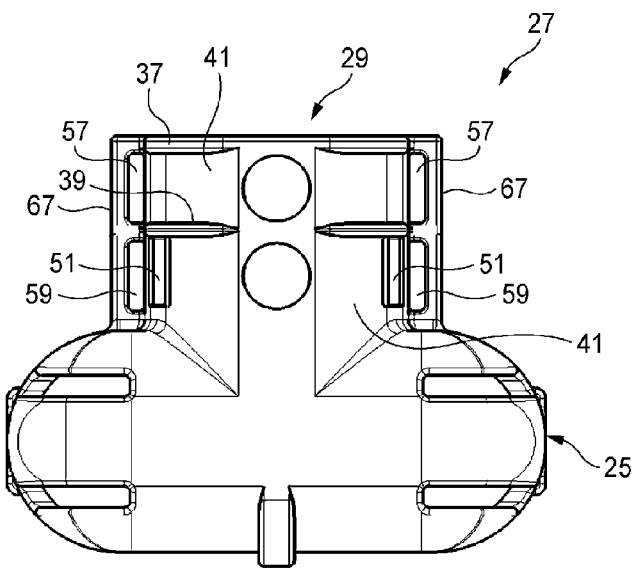
FIG. 1B is a view, as viewed from the direction of arrow A, of the electrical wire cover shown in FIG. 1A.

As shown in FIGS. 1A and 1B, a cover body (body) 27 of the electrical wire cover 11 has an electrical wire housing portion 25 for housing guided-out portions (i.e., portions immediately adjacent to the housing rear portion 21) of the electrical wires 19 and a corrugated tube fixing portion 29 for covering portions, bent in the direction perpendicular to the electrical wire housing portion 25, of the electrical wires 19. The corrugated tube fixing portion 29 is continuous with the electrical wire housing portion 25. That is, the cover body 27 has the semicylindrical corrugated tube fixing portion 29 as an integral part. And an end portion of each of plural kinds of corrugated tubes 31 having different diameters (see FIGS. 4A and 4B) in which the electrical wires 19 are inserted can be fixed to the corrugated tube fixing portion 29.

The plural electrical wires 19 placed inside the corrugated tube fixing portion 29 are inserted together in the corrugated tube 31. That is, the plural electrical wires 19 are protected by the corrugated tube 31. Made of a synthetic resin, each of the first to third corrugated tubes 35, 37, and 39 is formed so as to assume a bellows shape in which its outer circumferential surface is formed with circumferential projection strips 31 and outer circumferential grooves 33 which are arranged alternately (see FIGS. 4A and 4B) and to be flexible so as to be able to undergo flexural deformation while being curved. Since the guided-out portions (adjacent to the housing rear portion 21) of the electrical wires 19 are surrounded by the corrugated tube 31, these portions of the electrical wires 19 are protected without being exposed to the outside.

A first restriction wall 37 and a second restriction wall 39 project like brims from the outer circumferential surface of the corrugated tube fixing portion 29. The portion, between the first restriction wall 37 and the second restriction wall 39, of the outer circumferential surface of the corrugated tube fixing portion 29 serves as an electrical wire tie contact portion 41. That is, the first restriction wall 37 and the second restriction wall 39 can restrict the tying position of an electrical wire tie 43 (tying member; see FIGS. 4A and 4B) with respect to the outer circumferential surface of the corrugated tube fixing portion 29. The electrical wire tie 43 that is restricted by the first restriction wall 37 or the second restriction wall 39 fixes, that is, fastens tightly, the corrugated tube 31 to the inner peripheral surface of the corrugated tube fixing portion 29.

A pair of semicircular engagement projection strips 45 project from the inner peripheral surface of the corrugated tube fixing portion 29 so as to extend in the circumferential direction parallel with each other, and are engaged with outer circumferential grooves 35 of the corrugated tube 31. As a result, the corrugated tube 31 which is engaged with the semicircular engagement projection strips 45 are locked so as not to be movable in the axial direction.

Two outer circumferential end portions 47 of the semicylindrical corrugated tube fixing portion 29 are provided with respective tying member restricting portions 49 which determine a position of an electrical wire tie 43. Each of the tying member restricting portions 49 has a tying member insertion hole 51 in which an electrical wire tie 43 can be inserted and a guide wall portion 55 which guides the tip 53 of an electrical wire tie 43 to the electrical wire tie insertion hole 51. The electrical wire cover 11 has other tying member insertion holes 57 and 59 which have different electrical wire tie insertion positions corresponding to different diameters of the corrugated tubes 31, respectively. However, a description of the other tying member insertion holes 57 and 59 will be omitted because they are not indispensable elements of the invention.

Figure 3:
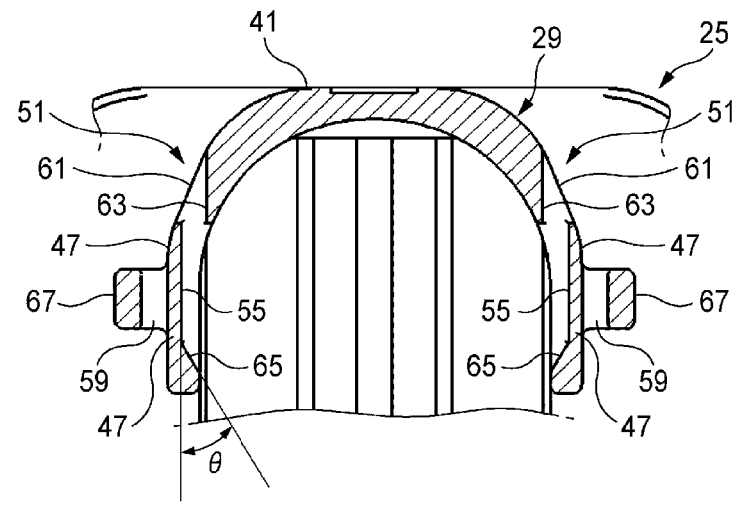
FIG. 3 is a horizontal sectional view, cut by a plane passing through guide wall portions, of a corrugated tube fixing portion of the electrical wire cover shown in FIG. 1B.

As shown in FIG. 3, each electrical wire tie insertion hole 51 is bored through a wall portion of the corresponding outer circumferential end portion 47 of the corrugated tube fixing portion 29 so as to extend parallel with the tangential direction of the first corrugated tube 31. The corrugated tube fixing portion 29 assumes a semicylindrical shape which is open on the bottom side in FIG. 3. The two (i.e., pair of) outer circumferential end portions 47 extend parallel with each other approximately in the tangential direction of the semicylindrical shape so as to be opposed to each other. Each tying member insertion hole 51 is bored from the side of the outer circumferential surface of the corrugated tube fixing portion 29 (i.e., the side of the electrical wire contact portion 41) to the side of the inner peripheral surface of the corrugated tube fixing portion 29 so as to extend in the extending direction of the two outer circumferential end portions 47. Therefore, each tying member insertion hole 51 has a prescribed length in the extending direction of the two outer circumferential end portions 47. On the outer circumference side, the tying member insertion hole 51 is opened in the electrical wire tie contact portion 41 to form an inclined opening 61. On the inner circumference side, the tying member insertion hole 51 is opened as a result of decrease there in the thickness of the wall portion of the corresponding outer circumferential end portion 47. The inner surface, defining part of the tying member insertion hole 51, of the corresponding outer circumferential end portion 47 is the associated guide wall portion 55. The surfaces that define respective parts of the tying member insertion holes 51 and confront the guide wall portions 55 are a pair of parallel hole surfaces 63.

Furthermore, each of the left and right guide wall portions 55 is formed with a tapered portion 65 having a prescribed angle θ on the side of the inner circumference of the corrugated tube fixing portion 29. When the tip 53 of an electrical wire tie 43 is inserted from the outside of the corrugated tube fixing portion 29 to its inside, the tapered portion 65 serves to guide the tip 53 of the electrical wire tie 43 so that the tip portion is bend toward the side of the center axis of the corrugated tube fixing portion 29 (see the part (b) of FIG. 5).

The tapered portion 65 serves not only to guide the tip portion of an electrical wire tie 43 so that it is bent toward the side of the center axis of the corrugated tube fixing portion 29 (described above) but also to guide the tip portion of an electrical wire tie 43 so that it goes along one guide wall portion 55 toward the corresponding one of the parallel hole surfaces 63 when its tip 53 hits the guide wall portion 55 from the side (see FIG. 3).

Projection portions 67 project outward in radial directions from the respective two outer circumferential end portions 47. The tying member insertion holes 57 and 59 are bored through each projection portion 67 so as to be arranged in the direction that is parallel with the axial line of the corrugated tube 31.

Next, a description will be made of how the above-configured electrical wire cover 11 works.

Figure 4A:
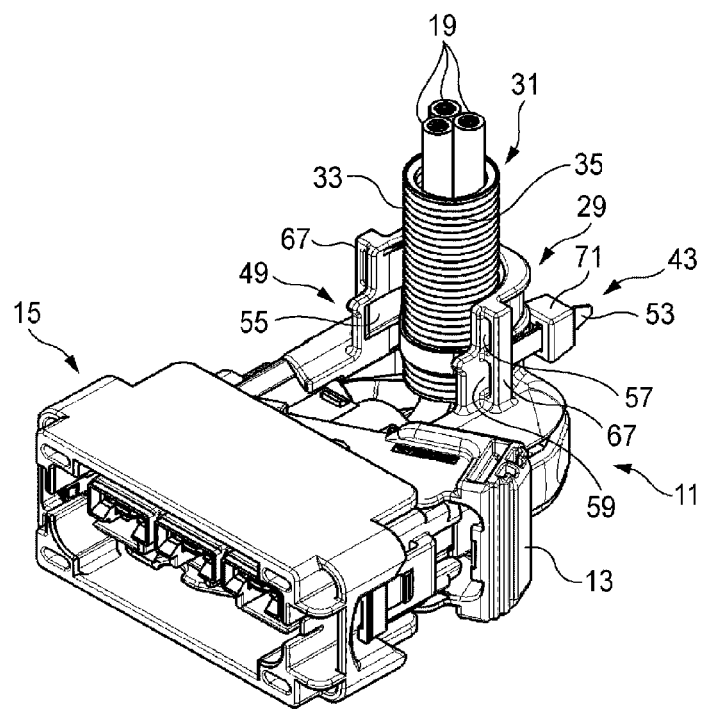
FIG. 4A is a perspective view of the electrical wire cover to which a corrugated tube is attached.
Figure 4B:
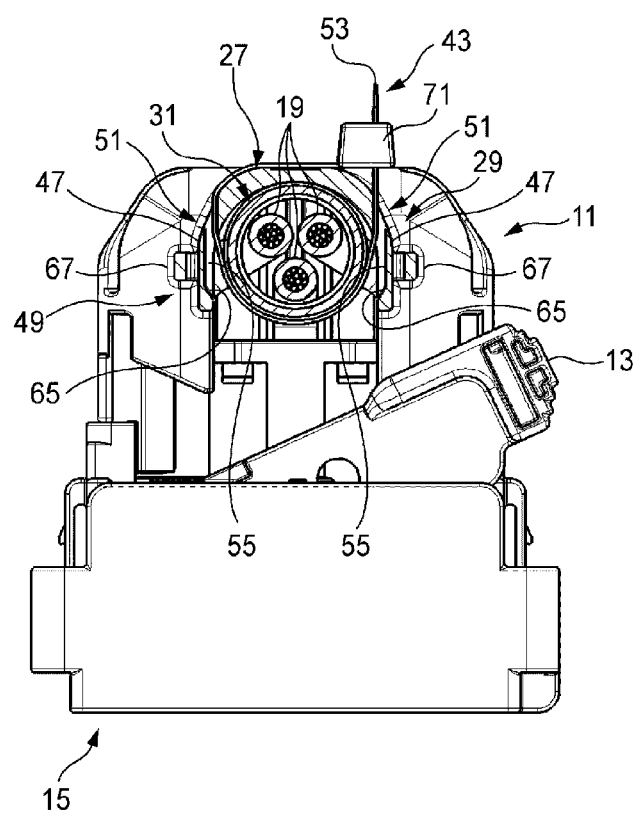
FIG. 4B is a front view, as viewed the electrical wire guide-out side, of the electrical wire cover shown in FIG. 4A.

To fix the corrugated tube 31 to the electrical wire cover 11, as shown in FIGS. 4A and 4B, an end portion of the corrugated tube 31 is placed in the corrugated tube fixing portion 29 in such a manner as to be engaged with the engagement projection strips 45 (see FIGS. 1A and 1B).

Subsequently, as shown in the parts (a)-(c) of FIG. 5, the tip 53 of an electrical wire tie 47 is inserted into one (in the part (a) of FIG. 5, left-hand) tying member insertion hole 51, wound around an outer circumferential surface of the corrugated tube 31, inserted into the tying member insertion hole 51 located on the opposite side, wound around the electrical wire tie contact portion 41 (see FIGS. 1A and 1B), and inserted into a buckle 71 (see FIGS. 4A and 4B) of the electrical wire tie 43. Thus, the corrugated tube 31 is fixed to the corrugated tube fixing portion 29.

As described above, in the electrical wire cover 11 according to the embodiment, to fix, to the corrugated tube fixing portion 29, the corrugated tube 31 whose end portion is placed in the corrugated tube fixing portion 29, an electrical wire tie 43 is positioned and fixed in such a manner as to be inserted into the tying member insertion holes 51 which are formed in the respective tying member restricting portions 49.

To fix, by winding an electrical wire tie 43 around it, the corrugated tube 31 whose outer circumferential grooves 35 are engaged with the respective engagement projection strips 45 which project from the inner peripheral surface of the corrugated tube fixing portion 29, the electrical wire tie 43 is inserted into one tying member insertion hole 51 from the outside of the corrugated tube fixing portion 29, wound around an outer circumferential surface, exposed on the side of the inner peripheral surface of the corrugated tube fixing portion 29, of the corrugated tube 31, and inserted into the tying member insertion hole 51 located on the opposite side. Thus, the corrugated tube 31 is fixed, that is, fastened tightly.

More specifically, as shown in the part (a) of FIG. 5, when inserted into one tying member insertion hole 51 from the outside of the corrugated tube fixing portion 29 (i.e., from the outside of the corrugated tube fixing portion 29 to its inside), the tip 53 of an electrical wire tie 43 is inserted to the tapered portion 65 along the guide wall portion 55. The thus-inserted tip portion of the electrical wire tie 43 is pressed against the tapered portion 65 having the prescribed angle θ and thereby bent toward the side of the center axis of the corrugated tube fixing portion 29 (i.e., bent inward) by the prescribed angle θ in the manner shown in the part (b) of FIG. 5. When the electrical wire tie 43 is pushed in further, it is bent inward by the tapered portion 65 in the manner shown in the part (c) of FIG. 5, as a result of which the distance between the tip 53 of the electrical wire tie 43 and the tying member insertion hole 51 located on the other side is decreased. This facilitates the insertion work.

Furthermore, each guide wall portion 55 for guiding the tip 53 of an electrical wire tie 43 to the opening of the corresponding tying member insertion hole 51 which is formed through the corresponding outer circumferential end portions 47 is formed adjacent to the tying member insertion hole 51. When an electrical wire tie 43 that has been inserted through one tying member insertion hole 51 from outside the corrugated tube 31 is inserted into the tying member insertion hole 51 located on the other side, the tying member insertion hole 51 located on the other side is not seen from the side of the inner peripheral surface of the corrugated tube fixing portion 29 because it is blocked by the corrugated tube 31. However, as shown in FIG. 6, the worker can easily bring the tip 53 of the electrical wire tie 43 to the outside of the corrugated tube fixing portion 29 through the tying member insertion hole 51 located on the other side by causing a tip portion of the electrical wire tie 43 to run along the visible guide wall portion 55.

As such, the electrical wire cover 11 according to the embodiment can increase the efficiency of attachment work in placing an end portion of the corrugated tube 31 in the corrugated tube fixing portion 29 and fixing, that is, tightly fastening, the former to the latter.

Features of the above-described electrical wire protecting member according to the embodiment of the invention will be summarized below concisely:

[1] An electrical wire protecting member (electrical wire cover) 11 comprising a body (cover body) 27 which surrounds electrical wires 19 to be installed; a semicylindrical corrugated tube fixing portion 29 which is an integral part of the body (cover body) 27 and to which an end portion of a corrugated tube 31 is fixed, wherein the electrical wires 19 are inserted in the corrugated tube; engagement projection strips 45 which project inward from the corrugated tube fixing portion 29 so as to extend in a radial direction of the corrugated tube fixing portion, and which engage with respective outer circumferential grooves 35 of the corrugated tube 31; a tying member (electrical wire tie) 43 which fixes, by tight fastening, the corrugated tube 31 to an inner peripheral surface of the corrugated tube fixing portion 29; and tying member restricting portions 49 which are formed in two respective outer circumferential end portions 47 of the corrugated tube fixing portion 29, and which determine a position of the tying member (electrical wire tie) 43, wherein each of the tying member restricting portions 49 has a tying member insertion hole (51) through which the tying member (electrical wire tie) 43 can be inserted and a guide wall portion 55 which guides the tip 53 of the tying member (electrical wire tie) 43 to the tying member insertion hole 51.

[2] The electrical wire protecting member (electrical wire cover) 11 according to the configuration of item [1], wherein the guide wall portion has a tapered portion which guides a tip portion of the tying member by bending the tip portion toward a center axis of the corrugated tube fixing portion when the tip of the tying member is inserted from outside the corrugated tube fixing portion to inside the corrugated tube fixing portion.

The electrical wire protecting member according to invention is not limited the one according to the above embodiment, and various modifications, improvements, etc. can be made as appropriate. And the material, shape, dimensions, number (where plural ones are provided), location, etc. of each constituent element of the above embodiment are optional and no limitations are imposed on them as long as the invention can be implemented.

For example, although the above embodiment is directed to the electrical wire cover 11 as an example electrical wire protecting member, it goes without saying that the invention can also be applied to various electrical wire protecting members such as harness protectors and electric connection boxes having a corrugated tube fixing portion.

For example, although the above embodiment is directed to the electrical wire cover 11 as an example electrical wire protecting member, it goes without saying that the invention can also be applied to various electrical wire protecting members such as harness protectors and electric connection boxes having a corrugated tube fixing portion.

The present application is based on Japanese Patent Application No. 2012-165184 filed on Jul. 25, 2012, the disclosure of which is incorporated herein by reference.

INDUSTRIAL APPLICABILITY

The electrical wire protecting member according to the invention can increase the efficiency of attachment work.

DESCRIPTION OF SYMBOLS

11 . . . Electrical wire cover (electrical wire protecting member)
19 . . . Electrical wire
27 . . . Cover body (body)
29 . . . Corrugated tube fixing portion
31 . . . Corrugated tube
35 . . . Outer circumferential groove
43 . . . Electrical wire tie (tying member)
45 . . . Engagement projection strip
47 . . . Two outer circumferential end portions
49 . . . Tying member restricting portion
51 . . . Tying member insertion hole
53 . . . Tip of tying member
55 . . . Guide wall portion
65 . . . Tapered portion

The invention claimed is:

1. An electrical wire protecting member, comprising:
a body which surrounds an electrical wire to be installed;
a semicylindrical corrugated tube fixing portion which is an integral part of the body and to which an end portion of a corrugated tube is fixed, wherein the electrical wire is inserted in the corrugated tube;
engagement projection strips which project inward from the corrugated tube fixing portion so as to extend in a radial direction of the corrugated tube fixing portion, and which engage with respective outer circumferential grooves of the corrugated tube;

a tying member which fixes, by tight fastening, the corrugated tube to an inner peripheral surface of the corrugated tube fixing portion; and tying member restricting portions which are formed in two respective outer circumferential end portions of the corrugated tube fixing portion, and which determine a position of the tying member, wherein each of the tying member restricting portions has a tying member insertion hole through which the tying member can be inserted and a guide wall portion which guides a tip of the tying member to the tying member insertion hole.

2. The electrical wire protecting member according to claim 1, wherein the guide wall portion has a tapered portion which guides the tip portion of the tying member by bending the tip portion toward a center axis of the corrugated tube fixing portion when the tip of the tying member is inserted from outside the corrugated tube fixing portion to inside the corrugated tube fixing portion.

3. The electrical wire protecting member according to claim 1, wherein the tying member restriction portions including first and second tying member restriction portions, and wherein the guide wall portion of the first tying member restricting portion opposes the guide wall portion of the second tying member restricting portion such that the tying member extends along each of the guide wall portions and through each of the tying member insertion holes.

4. The electrical wire protecting member according to claim 1, wherein the semicylindrical corrugated tube fixing portion includes an inner surface that faces the corrugated tube when the corrugated tube is positioned in the semicylindrical corrugated tube fixing portion, and each of the guide wall portions is recessed from the inner surface of the semicylindrical corrugated tube fixing portion.

5. The electrical wire protecting member according to claim 1, wherein the guide wall portions extend substantially parallel to each other.

6. The electrical wire protecting member according to claim 1, wherein each of the tying member restricting portions includes a hole surface that defines a part of the respective one of the tying member insertion holes, and each of the hole surface opposes the respective one of the guide wall portions.

7. The electrical wire protecting member according to claim 1, wherein each of the guide wall portions is unobstructed by other structure of the first and second tying member restricting portions.

* * * * *